US005645666A

United States Patent [19]
Jones

[11] Patent Number: 5,645,666
[45] Date of Patent: Jul. 8, 1997

[54] METHOD OF MANUFACTURE OF LENS AND RETAINER ASSEMBLY FOR INSTRUMENT CLUSTER

[75] Inventor: William Dennis Jones, Durand, Mich.

[73] Assignee: Delco Electronics Corporation, Kokomo, Ind.

[21] Appl. No.: 493,069

[22] Filed: Jun. 21, 1995

[51] Int. Cl.$^6$ ............................................. B32B 31/16
[52] U.S. Cl. .................. 156/73.1; 156/256; 156/508.2; 264/445
[58] Field of Search ..................... 156/73.1, 250, 156/256, 242, 508.1, 580.2; 264/442, 443, 445

[56] References Cited

U.S. PATENT DOCUMENTS

| | | | |
|---|---|---|---|
| 4,993,007 | 2/1991 | Meister | 368/294 |
| 5,135,592 | 8/1992 | Melvin | 156/73.1 |
| 5,141,677 | 8/1992 | Fogarty | 264/1.4 |
| 5,152,788 | 10/1992 | Isaacson et al. | 623/6 |
| 5,236,759 | 8/1993 | Sakurai | 428/76 |

Primary Examiner—James Sells
Attorney, Agent, or Firm—Jimmy L. Funke

[57] ABSTRACT

To manufacture a lens-retainer subassembly for an instrument cluster, a lens is cut from a flat acrylic sheet by a laser operation, and the resulting flat lens is pressed against the curved surface of a retainer by ultrasonic welding apparatus and bonded to the perimeter of the retainer. The retainer surface and a welding horn are shaped to conform to the desired lens shape and to portions of the retainer so that as the horns are moved together the lens will be squeezed between two complementary curved surfaces into the desired shape, and the welding fixes the lens shape.

7 Claims, 2 Drawing Sheets

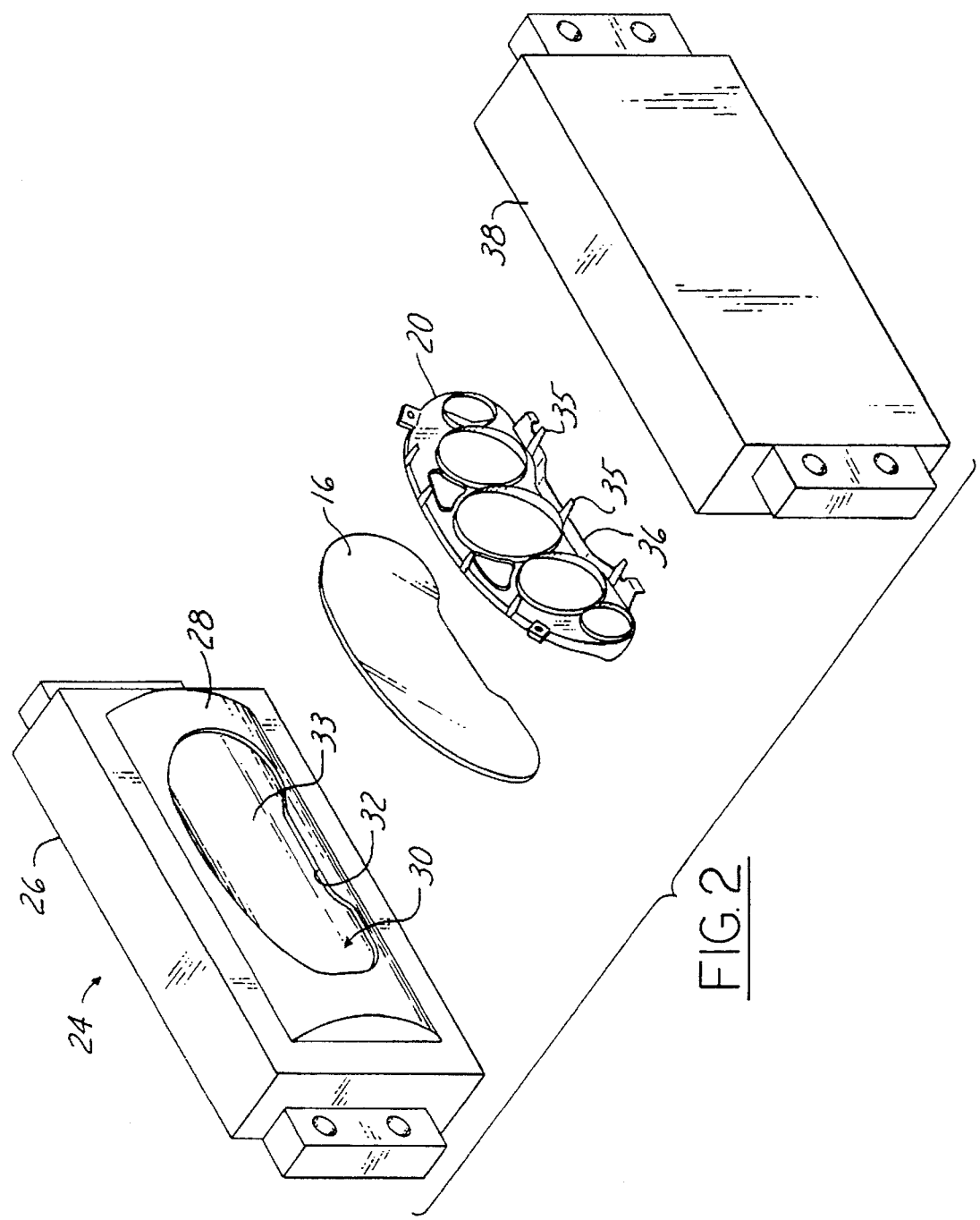

METHOD OF MANUFACTURE OF LENS AND RETAINER ASSEMBLY FOR INSTRUMENT CLUSTER

FIELD OF THE INVENTION

This invention relates to the manufacture of a lens for an instrument cluster and particularly to a method of making such a lens and assembling it to a retainer.

BACKGROUND OF THE INVENTION

Automotive instrument clusters have lenses which typically are injection molded from a plastic material and have a thickness of 2.5 to 3 mm. Most lenses are attached to retainers by screws and/or snap fasteners, although some newer designs employ ultrasonic welding of the molded lenses to their retainers to lower costs and to eliminate squeaks and rattles. There are numerous quality issues with designs using molded lenses, the molding operation being the prime contributor of problems. Optical inclusions (black and white specks), scratches, splay, suction cup marks and post molded dirt attraction make up the majority of the quality problems.

SUMMARY OF THE INVENTION

It is therefore an object of the invention to fashion an instrument cluster lens which is free of the problems associated with molded lenses. Another object is to assemble such a lens with a retainer. An additional object is to reduce the weight of instrument cluster lenses.

The instrument cluster lens is generally curved and is seated on and attached to a retainer having a curved surface conforming to the lens curvature. A lens blank is cut along its outline from a sheet of plastic stock material which is free of inclusions or other issues related to molded parts. Any required holes are cut at this time. The plastic stock is formed by extrusion and may be made with coating layers to provide a hardness coating or an anti-static coating, thereby reducing or eliminating surface damage such as scratches and reducing the attraction to dirt. The stock is thin enough to allow bending into the desired shape, and is much thinner than molded lenses to effect a weight savings.

After cutting, the lens blank is assembled to a retainer and curved to the desired shape by pressing against the curved surface of the retainer, and then bonded to the retainer, preferably around its whole periphery. The bonding is carried out by ultrasonic or vibration welding. The welding apparatus carries out the formation of the curve in the lens as well as doing the welding.

One welding horn has a recessed inner surface shaped according to the desired lens shape, and another welding horn is configured to hold the retainer. The retainer and the flat lens blank are loaded into the welding apparatus so that each part properly seats in a respective horn as the horns close together. The lens blank is thus curved against the retainer by the pressure of the horns, and the horns are vibrated laterally to effect bonding.

BRIEF DESCRIPTION OF THE DRAWINGS

The above and other advantages of the invention will become more apparent from the following description taken in conjunction with the accompanying drawings wherein like references refer to like parts and wherein:

FIG. 2 is an isometric view of opposed ultrasonic welding horns with parts to be welded, according to the invention.

DESCRIPTION OF THE INVENTION

The starting material for a lens is a sheet of plastic such as acrylic which may be either plain or coated with a hard scratch resistant material or with an anti-static material. A coated material is used in the FIG. 1 example. The plastic sheet typically is formed by extrusion, and where a coating is desired, the extra layer or layers can be applied by any desired process. The sheet may be an optical disc grade which is a laser inspected product free of optical inclusions. A sheet 1.25 mm thick is preferred, being flexible enough to be formed into the desired curvature while structurally strong enough to perform the protective lens function.

Figure 1:
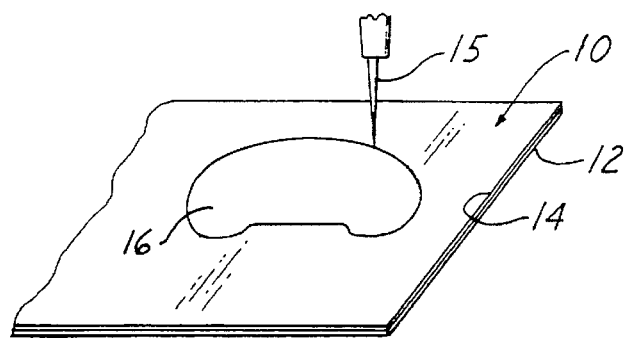
FIG. 1 is an isometric view of a sheet of lens material while being cut according to the invention.

Referring to FIG. 1, a flat sheet of plastic stock 10 comprising an acrylic base layer 12 and a coating 14 is cut by a laser beam 15 along a path which accords with the desired perimeter shape of a lens 16. Any aperture, not shown, needed for a stem hole in the lens is cut out in the same way.

Figure 3:
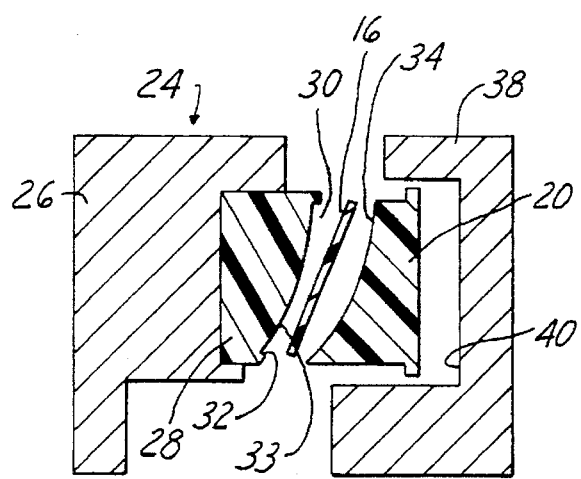
FIG. 3 and 4 are cross-sectional views of welding horns and parts in open and closed positions, respectively, according to the invention.
Figure 4:
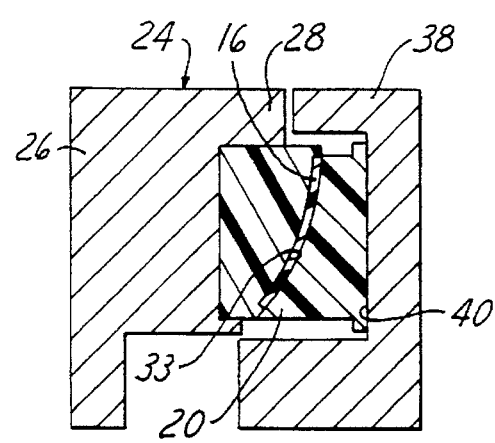

The lens 16 is formed into a curve and assembled to a retainer 20 by ultrasonic welders shown partially in FIGS. 2–4. As depicted in the drawings, the parts and apparatus of FIGS. 3 and 4 are slightly different from the FIG. 2 version but the operating surfaces are equivalent and have the same reference numerals. The welder has a first horn 24 comprising a rectangular steel base 26 carrying a convex urethane insert 28. The convex insert 28 has a shallow recess 30 to securely receive the lens 16 and a recess wall 32 for encompassing the lens periphery. The surface 33 of the recess 30 is convex to conform to the desired shape of the lens so that the surface 33 contacts the full extent of the lens 16. The same shape is on the forward face 34 of the retainer 20, especially around the periphery. The retainer has rearwardly extending appendages such as posts 35 and flanges 36. A second welder horn 38 has a surface 40 for supporting the retainer and has appropriate recesses, not shown, to accommodate the posts 35 and flanges 36 of the retainer 20. The surface 40 of the horn 38 is shaped according to the rear profile to the retainer 20 at least over a sufficient area to support the retainer during welding.

The schematic sectional views of the welding apparatus illustrated in FIGS. 3 and 4 show the open and closed positions of the welder and the lens 16 and retainer 20 aligned between the horns 24 and 38. It may be desirable to orient the welder with the first horn 24 above the horn 38 so that it moves vertically to close against the lens and retainer. Then when the welder is open the retainer will be placed on the support face of horn 38, and the lens 16 will be placed on the retainer 20. When the welder horns close together (FIG. 4) the lens enters the recess 30 where it is held by the wall 32, and the horn 24 presses the lens 16 against the retainer face 34 so that the lens is sandwiched between and shaped by the recess surface 33 and the retainer face 34 into the desired curvature.

To hold the lens in proper registry with the retainer, locating features may be added to the retainer; these features must be designed or located so that they do not interfere with vibrating movement of the lens during welding. Another approach is to employ a vacuum arrangement to hold the lens 16 in the recess 30. In an alternative setup, the horn 38 is oriented above the horn 24. Then the lens 16 is easily placed into the recess 30 so that it will lie there until the welder closes.

The welding step is a straight-forward application of ultrasonic welding techniques, and the power source and its application need not be discussed here. The welding does involve relative vibration of the horn to move the lens 16 laterally on the retainer face 34 (relative to the direction of closing) in a scrubbing action which causes bonding of the lens to the retainer. The vibration preferably is along the major axis of the lens 16. When released from the welder, the retainer permanently holds the lens in its curved configuration without the aid of fasteners.

It will thus be seen that the invention yields a product which is a secure assembly with no opportunity for squeaks and rattles. By using a thin lens material the weight of the assembly is reduced and many fasteners are eliminated to drastically reduce the number of parts. Since the lens is no longer injection molded, the range of possible lens materials is not limited to those suitable for injection molding. The materials can include coated or laminated materials to afford special properties such as abrasion resistance and reduced dirt attraction by static charges to eliminate common production problems. In addition, suction cup marks which may result from unloading parts from an injection molding press will no longer be a problem.

The embodiments of the invention in which an exclusive property or privilege is claimed are defined as follows:

1. A method of forming a curved lens for an instrument cluster and assembling to a curved retainer comprising the steps of:

cutting a flat lens from a flat sheet of plastic material;

forming the lens into a contour by pressing the lens against the retainer to conform to the curvature of the retainer;

and ultrasonically bonding the lens to the retainer.

2. The invention as defined in claim 1 wherein the step of ultrasonically bonding comprises welding the perimeter of the lens to the retainer.

3. The invention as defined in claim 1 including the step of providing the flat sheet of plastic material with at least one layer of coating material whereby a coated lens is produced.

4. The invention as defined in claim 1 wherein an ultrasonic welder has a welder horn surface in the desired shape of the lens, and wherein:

the forming step includes squeezing the lens between the welder horn surface and the retainer to shape the lens to the desired contour.

5. The invention as defined in claim 1 wherein an ultrasonic welder has a welder horn surface in the desired shape of the lens, and wherein:

the forming step includes sandwiching the lens between the welder horn surface and the retainer for contact of the full extent of the lens with the horn surface to attain the desired contour; and the bonding step comprises pressing the horn surface against the lens and vibrating the surface and the lens laterally to weld the lens to the retainer.

6. A method of forming a curved lens for an instrument cluster and assembling to a curved retainer by an ultrasonic welder which has a first welder horn with a surface in the desired shape of the lens and a second welder horn for holding the retainer, comprising the steps of:

cutting a flat lens from a flat sheet of plastic material;

installing the retainer in the second welder horn and inserting the lens between the retainer and the first welder horn;

forming the lens into a contour by closing the welder horns to sandwich the lens between the welder horn surface and the retainer for contact of the full extent of the lens with the horn surface to attain the desired contour; and pressing the welder horns together and vibrating the surface and the lens laterally to weld the lens to the retainer.

7. The invention as defined in claim 6 including the step of providing the flat sheet of plastic material with at least one layer of coating material whereby a coated lens is produced.

* * * * *